United States Patent
Higuchi et al.

(10) Patent No.: US 6,308,567 B1
(45) Date of Patent: Oct. 30, 2001

(54) ANGULAR VELOCITY SENSOR

(75) Inventors: Hirofumi Higuchi, Okazaki; Nobuyuki Ohya, Kariya; Tsuyoshi Fukada, Aichi-gun, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/458,954

(22) Filed: Dec. 10, 1999

(30) Foreign Application Priority Data

Dec. 10, 1998 (JP) .................................................. 10-351511

(51) Int. Cl.[7] .................................................. G01P 9/04
(52) U.S. Cl. .................................... 73/504.12; 73/504.08
(58) Field of Search ........................... 73/504.12, 504.13, 73/504.14, 504.04, 504.02, 504.08, 504.18

(56) References Cited

U.S. PATENT DOCUMENTS

| | | | |
|---|---|---|---|
| 5,001,940 | * 3/1991 | Ogawa | 73/504.12 |
| 5,313,835 | 5/1994 | Dunn | 73/505 |
| 5,329,815 | 7/1994 | Dunn et al. | 73/505 |
| 5,359,893 | 11/1994 | Dunn | 73/505 |
| 5,377,544 | 1/1995 | Dunn | 73/505 |
| 5,511,419 | 4/1996 | Dunn | 73/504.08 |
| 5,604,312 | 2/1997 | Lutz | 73/504.14 |
| 5,734,105 | 3/1998 | Mizukoshi | 73/504.02 |
| 5,894,090 | * 4/1999 | Tang et al. | 73/504.02 |
| 5,955,668 | * 9/1999 | Hsu et al. | 73/504.12 |
| 6,009,751 | * 1/2000 | Ljung | 73/504.02 |
| 6,089,090 | * 7/2000 | Namerikawa et al. | 73/504.13 |
| 6,151,964 | * 11/2000 | Nakajima | 73/504.13 |
| 6,155,115 | * 12/2000 | Ljung | 73/504.12 |

FOREIGN PATENT DOCUMENTS

| | | |
|---|---|---|
| 96/39615 | 12/1996 | (WO) . |
| 97/02467 | 1/1997 | (WO) . |

OTHER PUBLICATIONS

Teegarden et al., "How to Model and Simulate Microgyroscope Systems," The Practical Engineer, IEEE Spectrum, Jul. 1998, pp. 66–75.

* cited by examiner

*Primary Examiner*—Helen Kwok
(74) *Attorney, Agent, or Firm*—Pillsbury Winthrop LLP (57) ABSTRACT

A compact angular velocity sensor, which can improve an S/N (signal/noise) ratio. An angular velocity sensor includes an SOI substrate, four oscillatory masses movably supported to the SOI substrate, and four detection electrodes provided outer side of the oscillatory masses for detecting displacements of the oscillatory masses. The oscillatory masses are arranged point-symmetry with respect to a predetermined point K in a flat plane parallel to the SOI substrate. Each of the four oscillatory masses adjacent each other is oscillated in reverse phase in a circumstantial direction about the predetermined point K along the flat plane. When an angular velocity $\Omega$ is generated about the predetermined point K, detection weights of the oscillatory masses are displaced along a direction perpendicular to oscillation direction in the flat plane. Capacitance changes between the detection weights and the detection electrodes are processed in a circuit portion so as to output angular velocity detection signal S1 due to Corioli's force with canceling external acceleration and centrifugal force acted to the detection weights of the oscillatory masses.

17 Claims, 7 Drawing Sheets

ANGULAR VELOCITY SENSOR

CROSS REFERENCE TO RELATED APPLICATION

This application is based upon Japanese Patent Application No. Hei. 10-351511 filed on Dec. 10, 1998, the contents of which are incorporated herein by reference.

BACKGROUND OF THE INVENTION

1. Field of the Invention

This invention relates to angular velocity sensors, and particularly to an angular velocity sensor (e.g., a gyro sensor, yaw rate sensor), which can detect Corioli's force that acts on a movable portion provided on a substrate along a flat plane parallel to the substrate when angular velocity is generated about an perpendicular axis of the substrate as a result of oscillation of the movable portion.

2. Related Art

Conventionally, capacitance detection type angular velocity sensors have been used for vehicles, arcade games and so on, and have been developed to further downsize so as to reduce mounting space or cost. However, output signals based on capacitance changes due to an action of the angular velocity necessarily becomes small, since a capacitance detection portion is downsized. It is difficult to design a processing circuit to accurately take out only desired signals from such small output signals with removing noise.

This kind of angular velocity sensor is disclosed in JP A 8-220125. This conventional angular velocity sensor has two oscillatory masses (oscillators) that oscillate in opposite phases each other in a frame and an evaluation unit that processes measured signals from the angular velocity sensor. The evaluation unit filters out disturbance generated by the oscillatory masses. This conventional angular velocity sensor can output signals based on substantially twice capacitance changes and can remove the noise relatively easily.

However, according to the conventional angular velocity sensor, since the oscillatory masses having rectangular-shape are merely arranged in parallel to each other, a size of total angular velocity sensor tends to become bulky. Hence, it is inadequate from a downsizing standpoint.

In this conventional angular velocity sensor, it can be thought to further add the oscillatory masses to further enlarge the measured signals from the angular velocity sensor for the purpose of improving an S/N ratio (signal/noise ratio).

However, the mere addition of the oscillatory masses may cause inconveniences that the size of total angular velocity sensor becomes further bulky, and that the noise may not be adequately removed.

SUMMARY OF THE INVENTION

This invention has been conceived in view of the background thus far described and its first object is to provide an angular velocity sensor adequate for downsizing.

Its second object is to provide a compact angular velocity sensor, which can improve an S/N ratio.

According to the present invention, an angular sensor comprises: a plurality of movable portions movably supported on the substrate, being point-symmetry arranged each other with respect to a predetermined point and being movable in circumstantial direction about the predetermined point; and a detection portion confronted with the movable portions for detecting displacement of the movable portions.

According to this structure, one of Corioli's force and external force such as external acceleration can become the same direction among the point-symmetry arranged movable portions, and another of the Corioli's force and the external force can become reverse direction among the point-symmetry arranged movable portions. Therefore, a signal due to Corioli's force can be easily taken out with easily canceling the external force.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

DESCRIPTION OF THE PREFERRED EMBODIMENTS

A preferred embodiment of the present invention will be explained with reference to the accompanying drawings. In this embodiment, the present invention will be explained by exemplifying an angular velocity sensor for mounting on a vehicle for attitude control, which can detect Corioli's force that acts on a movable portion provided on a substrate along a flat plane parallel to the substrate when angular velocity is generated about an perpendicular axis of the substrate as a result of oscillation of the movable portion.

Figure 1:
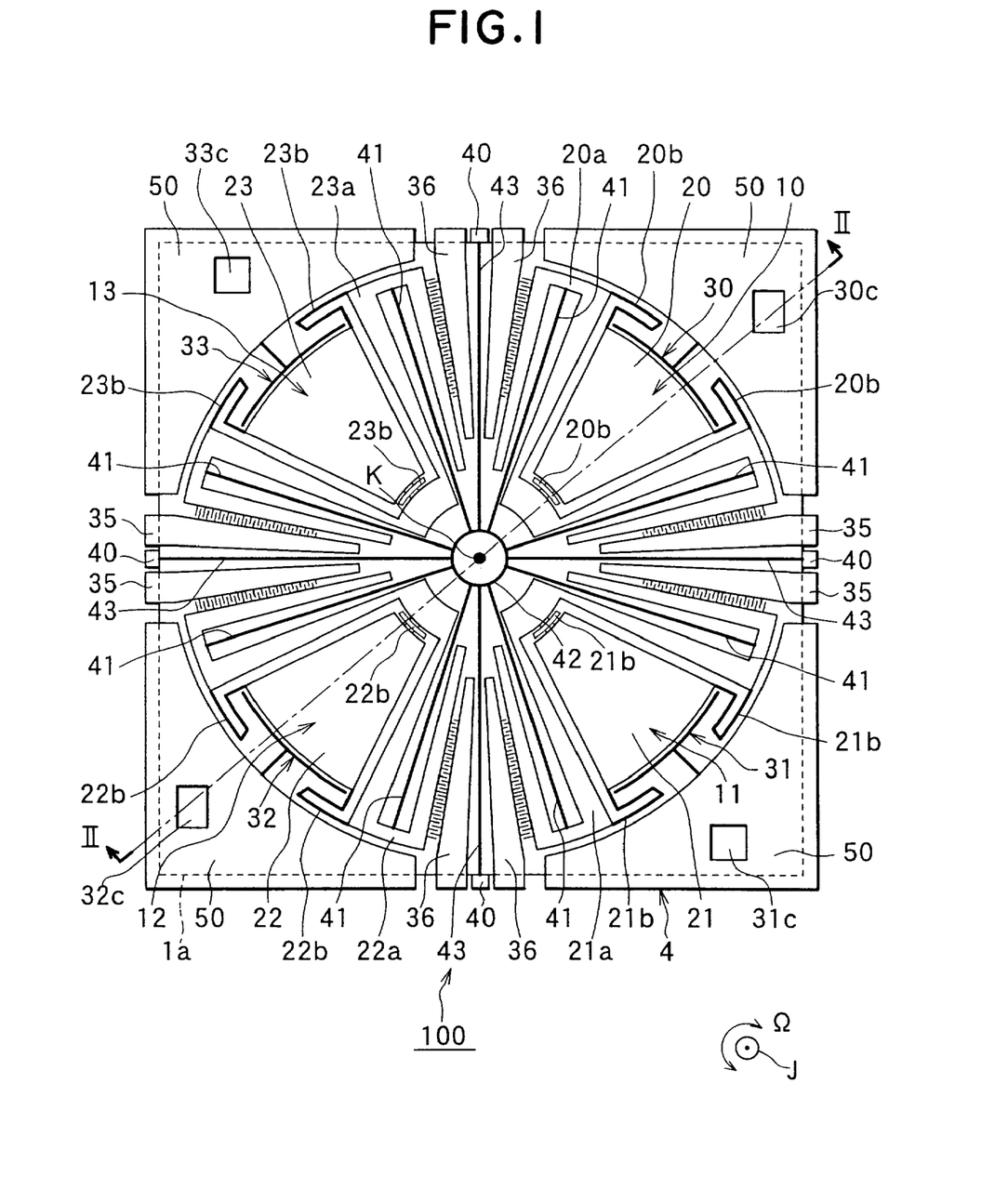
FIG. 1 is a plan view of an angular velocity sensor according to the present invention.
Figure 2:
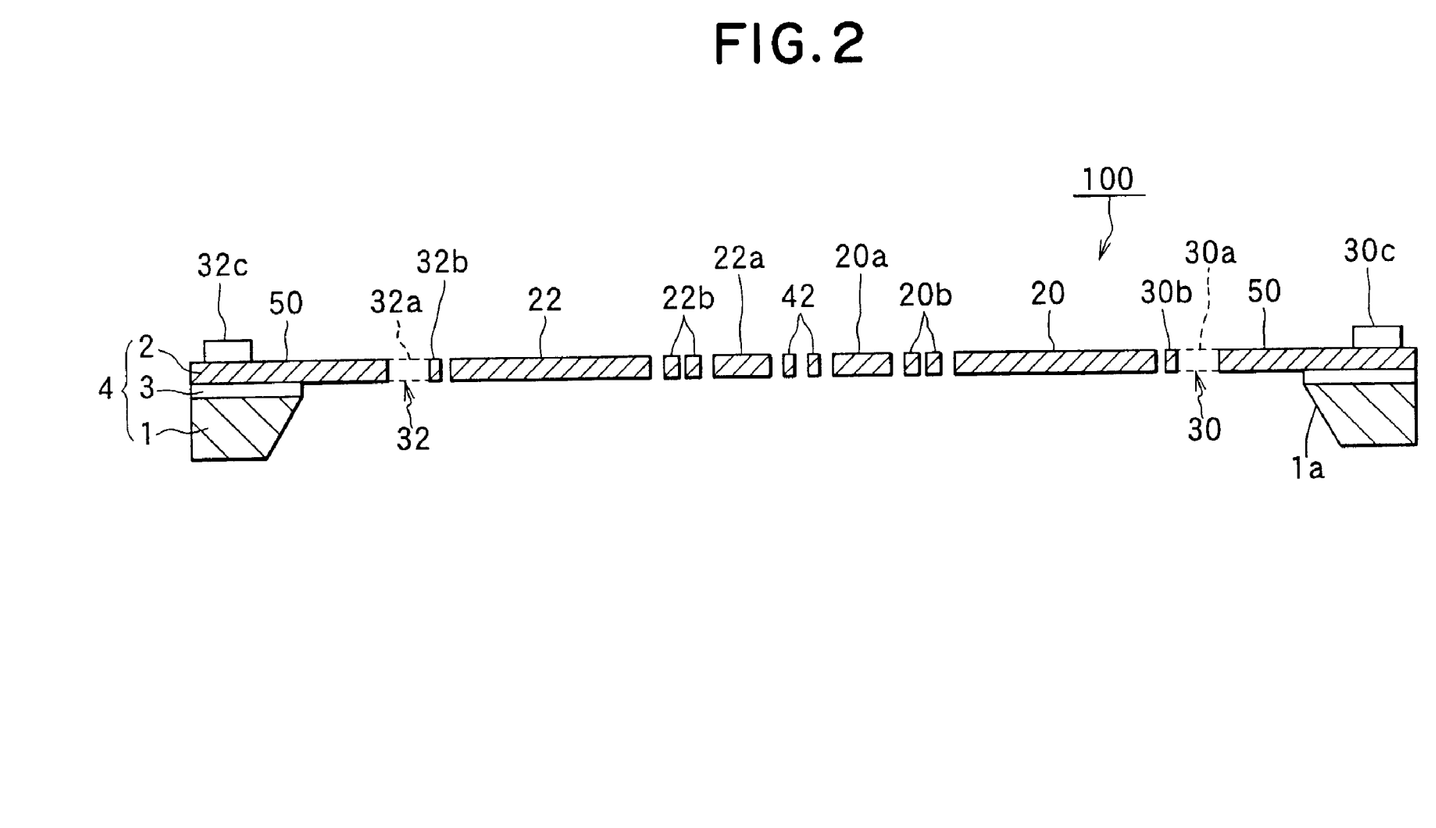
FIG. 2 is a sectional view taken along a line II—II in FIG. 1.
Figure 3:
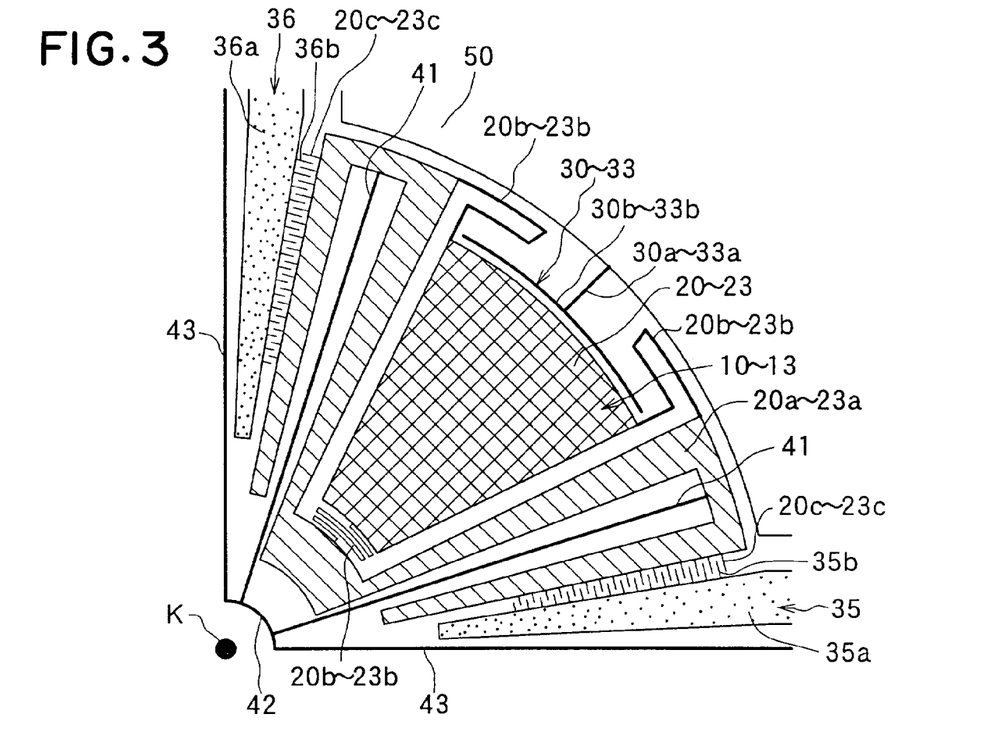
FIG. 3 is an enlarged detail view of the angular velocity sensor.

FIG. 1 is a plan view of an angular velocity sensor 100 of this embodiment, FIG. 2 is a sectional view taken along a line II—II in FIG. 1, and FIG. 3 is an enlarged detail view illustrating a structure of a movable portion. The angular velocity sensor 100 is formed by processing an SOI substrate 4 (substrate) using a micro-machine processing method using a semiconductor manufacturing technology. Here, the SOI substrate 4 (substrate) includes a first semiconductor layer 1 made of monocrystalline silicon, a second semiconductor layer 2 made of monocrystalline silicon and an insulating layer 3 made of oxide film interposed between the first and second semiconductor layer 1, 2. The angular velocity sensor 100 is to be mounted on the vehicle so that a main surface side of drawing in normal direction of FIG. 1 is set to upper side, and a back surface side of the drawing is set to lower side.

The first semiconductor layer 1 and the insulating layer 3 of the SOI substrate 4 are partly removed in a rectangular-shape so that the second semiconductor layer 2 is partly exposed at a portion where a main portion of this sensor is to be formed. The removed portion constitutes an opening portion 1a (shown by a dotted-line in FIG. 1) of the first semiconductor layer 1. The second semiconductor layer 2 positioned at a portion corresponding to the opening portion 1a is supported to the first semiconductor layer 1 via the insulating layer 3 at an outer peripheral portion of the opening portion 1a, and confronts with the opening portion 1a.

In this angular velocity sensor 100, a sensor main portion, which includes four oscillatory masses 10, 11, 12, 13, four detection electrodes 30, 31, 32, 33, and driving electrodes 35, 36, is formed by dividing the second semiconductor layer 2 positioned at the opening portion 1a by trenches. It should be noted that impurities are previously implanted into the monocrystalline silicon forming the first and second semiconductor layer 1, 2 so as to reduce resistivity thereof.

The four oscillatory masses (movable portion) 10–13 are arranged point-symmetry with respect to a predetermined point K on the flat plane parallel to the SOI substrate 4. Each of the oscillatory masses 10–13 includes a detection weight 20, 21, 22, 23 (shown by a cross hatching in FIG. 3), a suspended oscillation portion (oscillation portion) 20a, 21a, 22a, 23a (shown by a oblique line hatching in FIG. 3) positioned at surrounding portion of the detection weight 20–23, and a detection beam 20b, 21b, 22b, 23b for suspending the detection weight 20–23 to the suspended oscillation portion 20a–23a.

The detection beam 20b–23b (second elastic member) has elasticity so that the detection weights 20–23 can oscillate in a radial direction of the predetermined point K along the flat plane parallel to the SOI substrate 4 (direction perpendicular to an oscillation direction) with respect to the suspended oscillation portions 20a–23a. This structure can be realized by, for example, increasing an aspect ratio so as to become soft in the oscillation direction and to become hard in the other directions.

Figure 4:
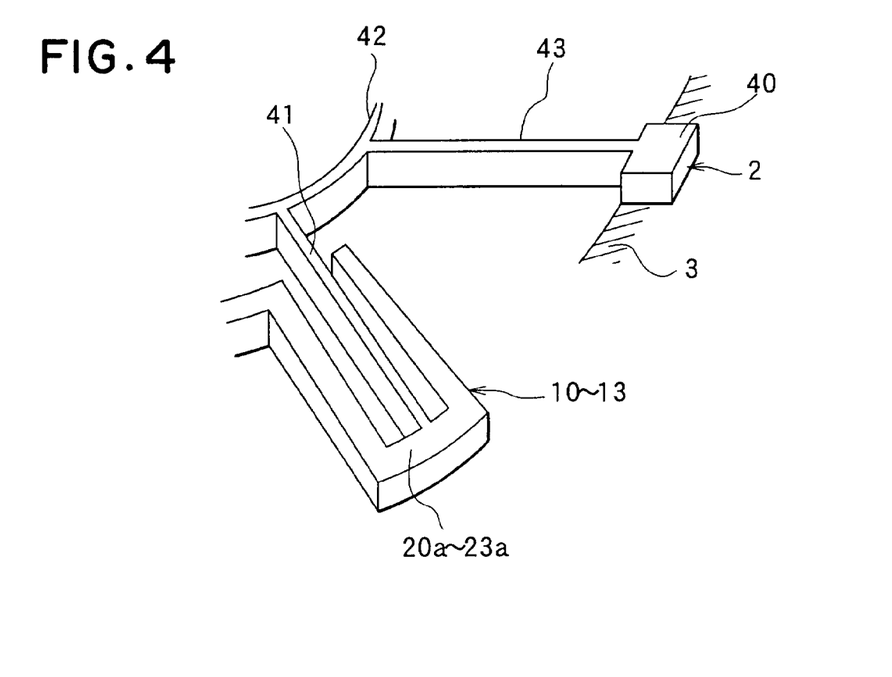
FIG. 4 is a partial perspective view illustrating a support and fix structure of an oscillatory mass.

FIG. 4 is a partial perspective view illustrating a support and fix structure of the oscillatory masses 10–13, and is shown only a support and fix portion. Each of the oscillatory masses 10–13 is supported to four oscillatory mass support portions 40 provided at outer peripheral portions of the opening portion 1a. Here, the oscillatory mass support portions 40 are made up of the second semiconductor layer 2 supported on the first semiconductor layer 1 via the insulating layer 3, and are positioned between each oscillatory masses 10–13 (see FIG. 1).

As shown in FIG. 4, each of the oscillatory masses 10–13 is suspended to a ring beam 42 having a ring-shape via an individual beam-shaped oscillation beam 41, which is extended from the suspended oscillation portion 20a–23a. A center of the ring beam 42 substantially corresponds to the predetermined point K. The ring beam 42 is suspended to the oscillatory mass support portions 40 via beam-shaped support beams 43 provided between each oscillatory mass 10–13.

Therefore, each of the oscillatory masses 10–13 is suspended to the oscillatory mass support portions 40 via each beam 41–43 connected each other, and is supported to the first semiconductor layer 1 via the insulating layer 3. Therefore, each of the oscillatory masses 10–13 and each of the beams 41–43 are confronted with the opening portion 1a of the first semiconductor layer 1.

Here, the oscillation beams 41 (first elastic member) connecting each of the oscillatory masses 10–13 and the ring beam 42 has elasticity so that each of the oscillatory masses 10–13 can oscillate in a circumferential direction (oscillation direction) about the predetermined point K along the flat plane parallel to the SOI substrate 4. This structure can be realized by, for example, increasing an aspect ratio or applying a rigid-frame structure so as to become soft in the oscillation direction and to become hard in the other directions.

Furthermore, each of the four detection electrodes 30–33 (detection portion) positions at outer side (far from the predetermined point K) of the oscillatory masses 10–13 in the flat plane parallel to the SOI substrate 4, and is confronted with the detection weight 20–23.

Each of the detection electrodes 30–33 is made up of a beam portion 30a–33a and an electrode portion (fixed electrode) 30b–33b. Each of the beam portions 30a–33a is extended to the detection weight 20–23 from the support portion 50, which is fixed to the first semiconductor layer 1 via the insulating layer 3. Each of the electrode portions 30b–33b is provided to a tip of the beam portion 30a–33a and is confronted with the opening portion 1a of the first semiconductor layer 1. Each of the detection electrodes 30–33 are supported by the support portion 50 with a one side like a cantilever, and are confronted with the opening portion 1a of the first semiconductor layer 1.

Furthermore, pad electrodes 30c, 31c, 32c, 33c for taking out output signals are formed on the support portions 50, which support the detection electrodes 30–33. Each of the electrodes 30c, 31c, 32c, 33c corresponds to each of the detection electrodes 30, 31, 32, 33.

Support portions 35a, 36a are provided to driving electrodes 35, 36, which position between the oscillatory masses 10–13 and the support beams 41, and are supported and fixed to the first semiconductor layer 1 via the insulating layer 3 like a cantilever. Electrode portions 35b, 36b having comb-shapes are provided to the support portions 35a, 36a with which the suspended oscillation portions 20a–23a of the oscillatory masses 10–13 are confronted. These driving electrodes 35, 36 made up of the support portions 35a, 36a, and the electrode portions 35b, 36b are confronted with the opening portion 1a of the first semiconductor layer 1.

Comb-shaped electrodes (confront electrode) 20c, 21c, 22c, 23c are provided to each of the suspended oscillation portions 20a–23a of the oscillatory masses 10–13, with which the electrode portions 35b, 36b of the driving electrodes 35, 36 are confronted. Each of the comb-shaped electrodes 20c, 21c, 22c, 23c is formed in a comb-shape so as to mesh with the electrode portions 35b, 36b of the driving electrodes 35, 36 (see FIGS. 1, 3).

Figure 5:
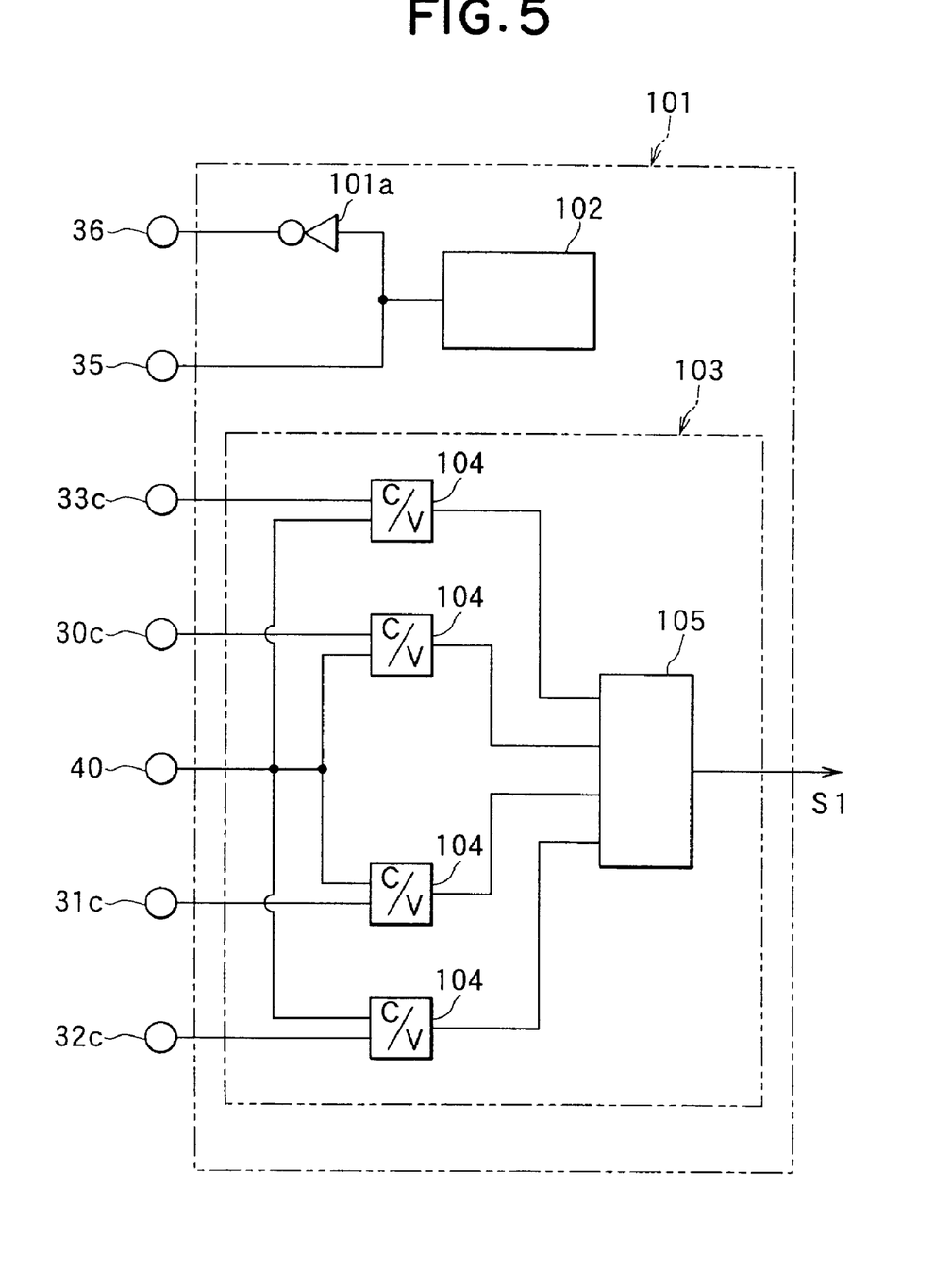
FIG. 5 is a schematic block diagram illustrating a circuit portion.

Next, a circuit portion (circuit means) 101 for operating the angular velocity sensor 100 will be explained hereinafter with reference to a schematic block diagram shown in FIG. 5. The circuit portion 101 actuates each of the oscillatory masses 10–13 and processes signals based on the displacement of the oscillatory masses 10–13 along the flat plane parallel to the SOI substrate 4, and is provided with a driving circuit 102 and a detection/processing circuit 103. The driving circuit 102 is connected to the support portions 35a, 36a of the driving electrodes 35, 36 and one of four oscillatory mass support portions 40. The detection/processing circuit 103 is connected to the pad electrodes 30c–33c and one of four oscillatory mass support portions 40.

The driving circuit 102 applies a driving signal to the driving electrodes 35, 36 to oscillate the oscillatory masses 10–13. The detection/processing circuit 103 includes four capacitance-voltage conversion circuits 104 (shown as C/VinFIG. 5) such as switched-capacitors that convert capacitance changes between the detection weights 20–23 of the oscillatory masses 10–13 and detection electrodes 30–35 into voltage changes, and a processing circuit 105 that processes voltage values from the capacitance-voltage conversion circuits 104 and outputs the processed voltage values as an angular velocity detection signal The angular velocity sensor 100 having the above-described structure is manufactured by the following steps. FIGS. 6A to 6H are sectional views illustrating manufacturing steps of the angular velocity sensor 100 taken along the line II—II in FIG. 1.

Figure 6A:
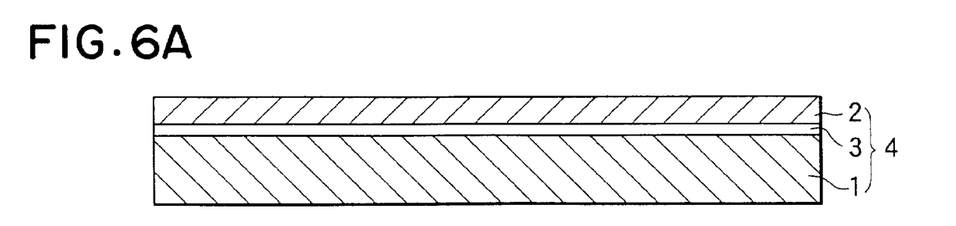
FIGS. 6A to 6H are sectional views illustrating manufacturing steps of the angular velocity sensor.

At step shown in FIG. 6A, the SOI substrate 4 having the first and second semiconductor layer 1, 2 and the insulating layer 3 is provided. As described the above, each of the first and second semiconductor layer 1, 2 is made of the monocrystalline silicon whose crystal orientation is (100). The insulating layer 3 is made of silicon oxide film having a thickness of approximately 1 μm, for instance, and is interposed between the first and second semiconductor layer 1, 2. Impurities such as phosphorus (P) are implanted and diffused into entire surface of the second semiconductor layer 2 ($N^+$ diffusion) so as to lower a surface resistance of the second semiconductor layer 2 and a contact resistance at a contact portion between the surface and the pad electrodes 30c–33c made of aluminum to be formed later.

Figure 6B:
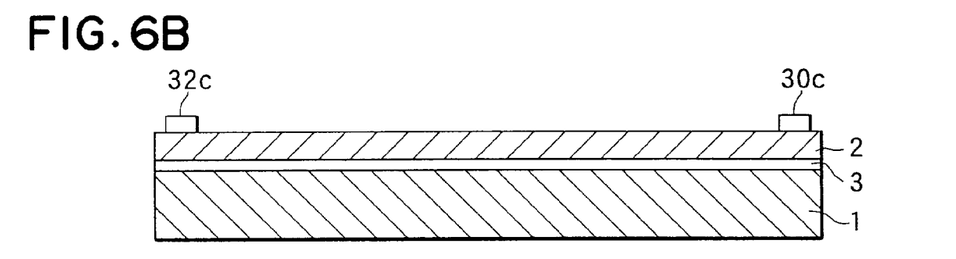

At a step shown in FIG. 6B, electrode material such as aluminum is deposited on the surface (second semiconductor layer 2) of the SOI substrate 4 by, for example, 1 μm. After that, the deposited aluminum is patterned by using both photolithography and etching so that the pad electrodes 30c–33c for taking out the signals are formed.

Figure 6C:
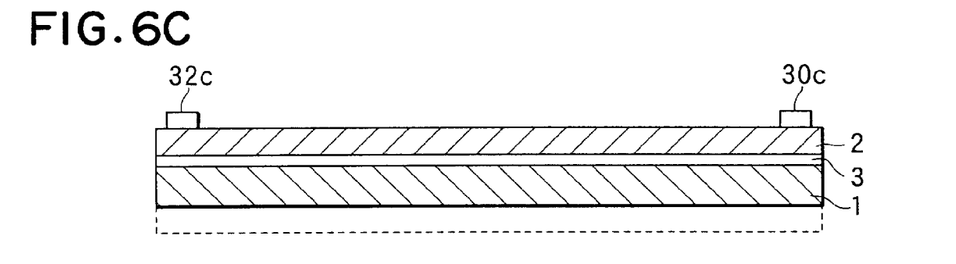

At a step shown in FIG. 6C, the SOI substrate 4 is thinned to a predetermined thickness (e.g., 300 μm) by polishing a back surface (first semiconductor layer 1) of the SOI substrate 4, and the back surface is mirror-finished.

Figure 6D:
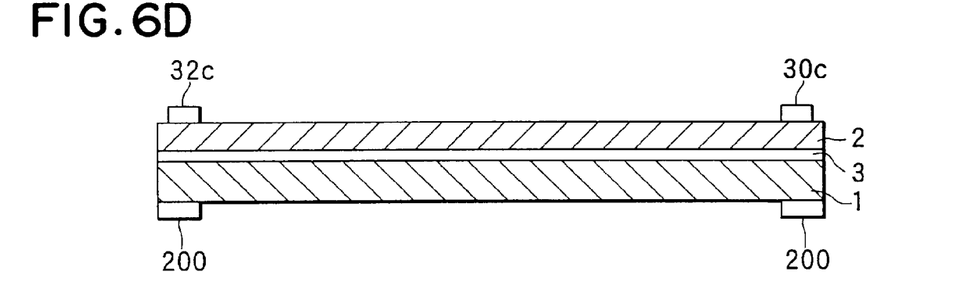

At a step shown in FIG. 6D, a plasma SiN (silicon nitride) film 200 is deposited on the back surface (first semiconductor 1) of the SOI substrate 4 by, for example, 0.5 μm. After that, the deposited plasma SiN200 film is patterned by using both photolithography and etching so as to form an opening at a predetermined region.

Figure 6E:
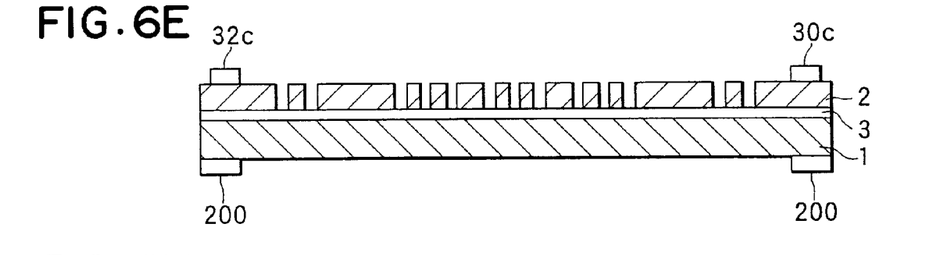

At a step shown in FIG. 6E, a resist having a pattern defining the oscillatory masses 10–13, each electrode 30–36, each beam 41–43 and so on, is formed on the surface of the second semiconductor layer 2. After that, trenches vertically reaching the insulating layer 3 are formed by dry etching.

Figure 6F:
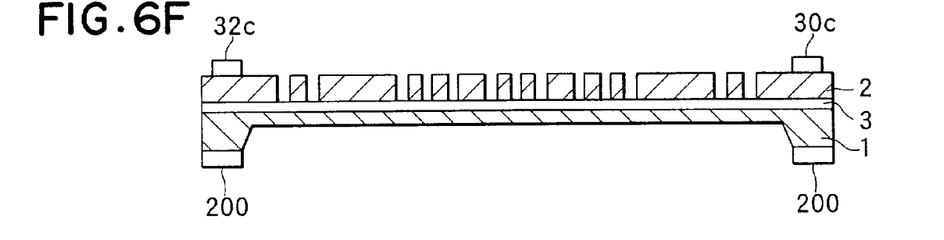

At a step shown in FIG. 6F, the first semiconductor layer 1 is deeply etched using etchant such as KOH solution by using the plasma SiN film 200 as a mask. In this stage, if the etching is advanced until the insulating layer 3, the insulating layer 3 may be cracked by pressure of the etchant and the SOI substrate 4 may be fractured. Therefore, etching time is controlled so that the etching is stopped when a remained silicon of the first semiconductor layer 1 becomes 10 μm, for example, so as to prevent the insulating layer 3 from cracking.

Figure 6G:
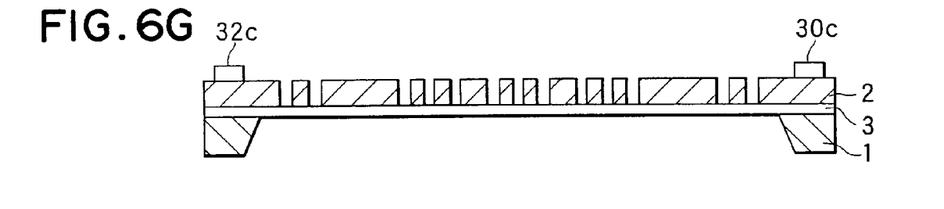

At a step shown in FIG. 6G, the silicon of the first semiconductor layer 1 remained at the step shown in FIG. 6F is removed by using plasma dry etching. In this etching, the plasma SiN film 200 on the back surface of the SOI substrate 4 is also removed.

Figure 6H:
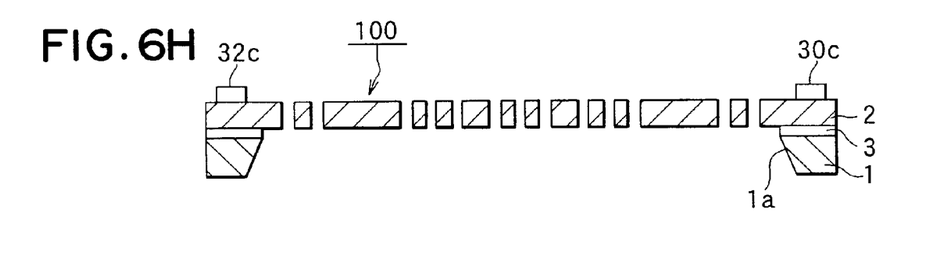

Finally, at a step shown in FIG. 6H, the insulating layer 3 is removed by performing a dry etching from the back surface of the SOI substrate 4 so that the oscillatory masses 10–13, the electrodes 30–36 and the beams 41–43 are formed. After that, the each portion is electrically connected with the circuit portion 101 by wiring to complete the angular velocity sensor 100 shown in FIG. 2.

Figure 7:
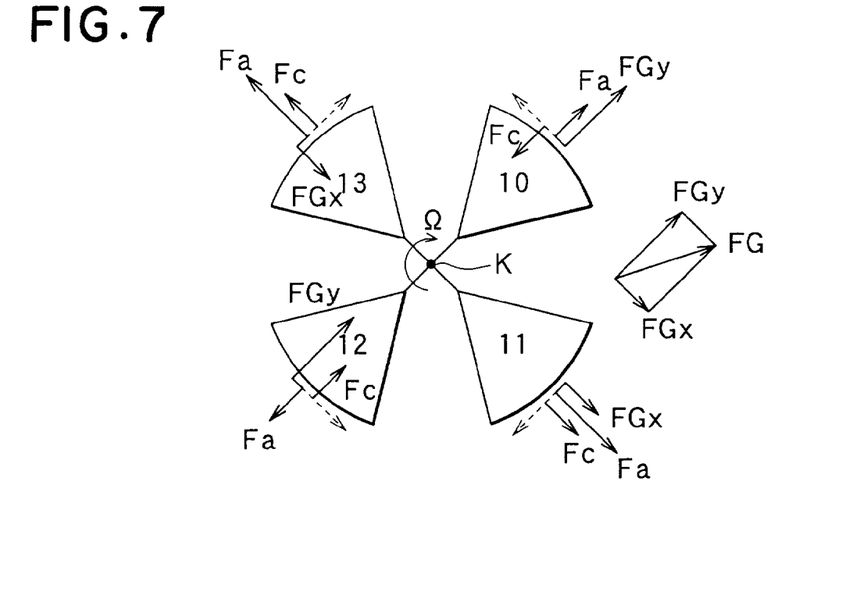
FIG. 7 is a diagram illustrating an operation of the angular velocity sensor.

Next, an operation of the angular velocity sensor 100 will be explained with reference to a model shown in FIG. 7, which corresponds plan view in FIG. 1. In FIG. 7, in a circumstantial direction about the predetermined point K, the clockwise direction is defined as positive direction, and the counterclockwise direction is defined as negative direction. Furthermore, in a radial direction, a direction far from the predetermined point K is defined as positive direction, and a direction near the predetermined point K is defined as negative direction.

According to the angular velocity sensor 100, apply voltage signals (driving signals) having rectangular wave or sin wave are applied to the driving electrode 35 and the driving electrode 36 via inverter 101a so that each voltage signal is applied in reverse (opposite) phase to the driving electrodes 35, 36, respectively. For example, a voltage signal having 2.5 V is applied to the oscillatory mass support portions 40, and rectangular voltage signals having amplitude of 5 V with respect to 2.5 V level are applied to the driving electrodes 35, 36 in the reverse phase. As a result, electrostatic forces are generated between the electrode portions 35b, 36b of the driving electrodes 35, 36 and the comb-shaped electrodes 20c–23c of the oscillatory masses 10–13.

In this time, as shown by dotted-lines in FIG. 7, each of the four oscillatory masses 10–13 adjacent to each other is oscillated in reverse phase in the circumstantial direction about the predetermined point K along the flat plane parallel to the SOI substrate 4 by elasticity force of the oscillation beams 41 (first elastic member).

In this oscillation, the oscillatory masses 10, 12, which confront with each other with the predetermined point K interposed therebetween (that is, point symmetry with respect to the predetermined point K), oscillate in the same phase (same phase oscillation between the confronted two movable portion). The oscillatory masses 11, 13, which confront with each other with the predetermined point K interposed therebetween, also oscillate in the same phase. However, the phase (e.g., negative direction) of two oscillatory masses 10, 12 are a reverse phase of the phase (e.g., positive direction) of two oscillatory masses 11, 13 (half-and-half reverse phase oscillation).

When the oscillatory masses 10–13 are oscillated in the flat plane parallel to the SOI substrate 4, angular velocity Ω is generated about a perpendicular axis of the SOI substrate 4 (shown by label J in FIG. 1). As a result, Corioli's force (Fc) acts on the oscillatory masses 10–13 in the circumstantial direction about the predetermined point K in the flat plane. For example, as shown in FIG. 7, when the angular velocity Ω is generated in the clockwise direction about the predetermined point K, the Corioli's force (–Fc) is applied to the oscillatory masses 10, 12 whose phases are negative, and the Corioli's force (+Fc) is applied to the oscillatory masses 11, 13 whose phases are positive.

When the Corioli's force is acted, as shown in FIG. 7, each of the detection weights 20–23 is oscillated (displaced) in the radial direction of the predetermined point K (a direction perpendicular to the oscillation direction) along the flat plane parallel to the SOI substrate 4 by the elasticity force of the detection beams (second elastic member) 20b–23b. The displacements of the detection weights 20–23 are detected as capacitance changes between the detection weights 20–23 and the electrode portions 30b–33b of the detection electrodes 30–33. Here, in the radial direction shown in FIG. 7, a direction in which the capacitance increases is defined as positive direction, and a direction in which the capacitance decreases is defined as negative direction.

The capacitance changes are detected as follows. The capacitance values are inputted to the capacitance-voltage conversion circuit 104 from the detection electrodes 30–33 through the pad electrodes 30c–33c, and are converted to the voltage values in the capacitance-voltage conversion circuit 104. The voltage values are calculated and processed in the processing circuit 105, and are outputted as the angular velocity detection signal S1.

The above-described operations are basic operations of the angular velocity sensor 100. It should be noted that because the oscillatory masses 10–13 are oscillated in the circumstantial direction as the whole, centrifugal force acts on the detection weights 20–23 in the direction on which Corioli's force acts, and external acceleration (external force, external G) acts to the detection weights 20–23 in the direction on which Corioli's force acts as a result of hard-stopping, hard-acceleration or the like.

It needs to remove such the centrifugal force ("Fa" in FIG. 7) or the external acceleration ("FG" in FIG. 7) because these forces are carried as noise components on the output. In this embodiment, the centrifugal force and the external acceleration are cancelled by performing the following calculations in the processing circuit 105. Furthermore, the processing circuit 105 can output signals due to the Corioli's force multiplied by the number of the oscillatory masses (substantially four, in this embodiment).

As shown in FIG. 7, when the angular velocity Ω is applied to the angular velocity sensor 100 while four oscillatory masses 10–13 are oscillated, forces $F_{10}$, $F_{11}$, $F_{12}$, $F_{13}$ acted on the detection weights 20–23 are calculated as following equations (1) to (4).

$$\text{Oscillatory mass 10: } F_{10}=-Fc+Fa+FGy \quad (1)$$

$$\text{Oscillatory mass 11: } F_{11}=+Fc+Fa+FGx \quad (2)$$

$$\text{Oscillatory mass 12: } F_{12}=-Fc+Fa-FGy \quad (3)$$

$$\text{Oscillatory mass 13: } F_{13}=+Fc+Fa-FGX \quad (4)$$

Here, Fc represents the Corioli's force; Fa represents the centrifugal force; and FGx, FGy represent x-component and y-component of the external acceleration.

Here, since the desired signal is only Fc, and the other signals are noise component, the following calculation (5) is performed in the processing circuit 105.

$$F=-F_{10}+F_{11}-F_{12}+F_{13}=4Fc \quad (5)$$

In this way, since the calculation process in the circuit portion 101 can cancel all of the noise components (Fa, FG) and output the signals (angular velocity signal S1) based on the Corioli's force multiplied by four, the S/N ration of the angular velocity sensor 100 can be improved. Furthermore, since the calculation processes are made up of addition and subtraction, a circuit structure can be simplified and can be achieved by using conventional calculator.

Modification

Figure 8:
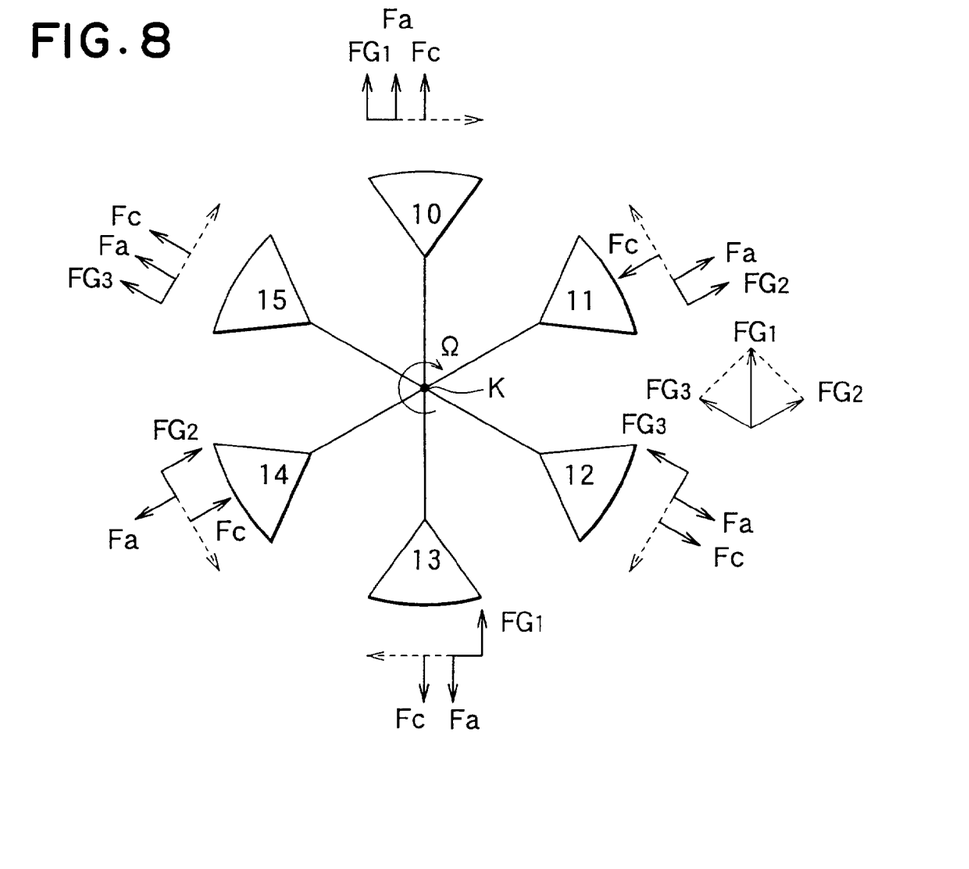
FIG. 8 is a diagram illustrating an operation of a modified angular velocity sensor.

FIG. 8 shows an angular velocity sensor in which the number of the oscillatory masses 10–15 point-symmetry arranged with respect to the predetermined point K is six. Here, the positive direction and negative direction in the circumstantial direction and the radial direction about the predetermined point K are the same as those in FIG. 7.

According to this angular velocity sensor, six oscillatory masses 10–15 are point-symmetry arranged with respect to the predetermined point K in the flat plane parallel to the SOI substrate 4. Here, the six oscillatory masses 10–15 are constructed so that two oscillatory masses 10, 13 (positive direction), two oscillatory masses 11, 14 (negative direction) and two oscillatory masses 12, 15 (positive direction), which are confronted with each other with respect to the predetermined point K, are oscillated in the same phases, respectively, in the circumstantial direction as shown by dotted-lines in FIG. 8.

As shown in FIG. 8, when the angular velocity Ω along the clockwise direction about the predetermined point K and the external acceleration $FG_1$ from the oscillatory mass 13 side to the oscillatory mass 10 are applied to the angular velocity sensor 100 while six oscillatory masses 10–15 are oscillated, forces $F_{11}$, $F_{11}$, $F_{12}$, $F_{13}$, $F_{14}$, $F_{15}$ acted on not-shown six detection weights are calculated as following equations (6) to (11).

$$\text{Oscillatory mass 10: } F_{10}=+Fc+Fa+FG_1 \quad (6)$$

$$\text{Oscillatory mass 11: } F_{11}=-Fc+Fa+FG_2 \quad (7)$$

$$\text{Oscillatory mass 12: } F_{12}=+Fc+Fa-FG_3 \quad (8)$$

$$\text{Oscillatory mass 13: } F_{13}=+Fc+Fa-FG_1 \quad (9)$$

$$\text{Oscillatory mass 14: } F_{14}=-Fc+Fa-FG_2 \quad (10)$$

$$\text{Oscillatory mass 15: } F_{15}=+Fc+Fa+FG_3 \quad (11)$$

Here, Fc represents the Corioli's force; Fa represents the centrifugal force; and $FG_2$, $FG_3$ represent $FG_1 \cdot \cos(\pi/3)$, $FG_1 \cdot \sin(\pi/3)$, respectively.

Here, addition and subtraction are performed as the following equation (12) to take out the desired signal Fc.

$$F=F_{10}-F_{11}+F_{12}+F_{13}-F_{14}+F_{15}=6Fc+2Fa \quad (12)$$

In this way, since the calculation process in the circuit portion 101 can cancel all of the external acceleration and output the angular velocity signal S1 based on the Corioli's force multiplied by six, the S/N ration of the angular velocity sensor 100 can be improved. Here, the centrifugal force Fa remains in the angular velocity signal S1 as an offset component, however, such the centrifugal force Fa can be cancelled in the calculation process in the circuit portion 101 by previously evaluated as the offset component.

As described the above, even number (at least 2) oscillatory masses are point-symmetry arranged with respect to the predetermined point K in the flat plane parallel to the SOI substrate 4, the same phase oscillation is performed between the confronted two movable portions, and calculation process (addition and subtraction) represented by the equations (1) to (12) are performed. As a result, the output signal due to the Corioli's force multiplied by the number of the oscillatory masses with canceling the external acceleration. Particularly, when the number of the oscillatory masses is even number to or more than four, the S/N ratio can be improved compared to the case where the number of the oscillatory masses is two. It should be noted that it is preferable to set the number of the oscillatory masses to even number, because noncancelable term of the external acceleration remains in the angular velocity signal S1 in the case of odd number.

In the angular velocity sensor 100 having four oscillatory masses 10–13, two oscillatory masses 10, 12 confronted with each other (arranged point-symmetry) with respect to the predetermined point K are oscillated in the same phase. In this case, the external acceleration FGy acted to both the oscillatory masses 10, 12 can become reverse direction (positive and negative) each other, and Corioli's force Fc acted there to can become the same direction each other (both negative). Operations of the two oscillatory masses 11, 13 are the same as these operations described the above.

Therefore, when the angular velocity sensor 100 has at least one pair of oscillatory masses (movable portions) (e.g., the oscillatory mass 10 as the first movable portion and the oscillatory mass 12 as the second movable portion) oscillated in the same phase, the external acceleration can be easily cancelled by simple calculations (addition and subtraction) and only the signals due to the Corioli's force can be outputted.

Furthermore, as can be understood by comparing the four oscillatory mass type with the six oscillatory mass type, the centrifugal force can be cancelled in addition to the external acceleration with simple circuit by 1) setting the number of the oscillatory masses to the multiples of four; 2) arranging them point-symmetry; 3) oscillating them in the same phase and the reverse phase (The same phase oscillation between the confronted two movable portion, and the half-and-half reverse phase oscillation); and 4) performing calculation process (addition and subtraction) based on the equations (1) to (5) so as to sum up each signals due to the displacements of the oscillatory masses (calculation of F).

Here, when the number of the oscillatory masses is even number other than the multiples of four (e.g., 2, 6, 10, 14 . . . 2(2n+1)), the centrifugal force component remains in the angular velocity signal S1 as a result of cancellation of the external acceleration component. However, such the centrifugal force component can be removed as the offset by calculation process in the circuit portion.

When the oscillatory masses are point-symmetry arranged by the multiples of four (e.g.,4, 8, 12, 16 . . . 4n), the "same phase oscillation between the confronted two movable portion" and the "half-and-half reverse phase oscillation" can be adequately performed, by oscillating the oscillatory masses (movable portions) adjacent to each other in the reverse phase in the circumstantial direction about the predetermined point K.

Furthermore, according to this embodiment, the entire sensor becomes circle so as to be downsized, by arranging even number (to or more than two) oscillatory masses (movable portions) 10–15 point-symmetry with respect to the predetermined point K in the flat plane parallel to the SOI substrate 4, and by oscillating them in the circumstantial direction about the predetermined point K.

Other modification

The detection electrodes (detection portions) 30–33 for detecting theCorioli's force are arranged at outer side of the oscillatory masses 10–13 with respect to the predetermined point K in the flat plane parallel to the SOI substrate 4, however, the detection electrodes 30–33 may be arranged at inner side of the oscillatory masses 10–13. That is, it is preferable to arrange all of the detection electrodes (detection portions) 10–13 either outer side or inner side with respect to the oscillatory masses 10–13, because signs of the Corioli's force and the external acceleration are important to performing the calculation process and because the sign of the Corioli's force depends on positions of the detection electrodes.

Here, the detection portions are constructed so as to detect the capacitance changes, however, the detection portions may be constructed so as to detect the displacement of the detection weights as electromagnetic changes. Furthermore, the circuit portion (circuit means) 101 may be formed on the SOI substrate 4 the same as the angular velocity sensor 100, or may be formed on the other substrate.

What is claimed is:

1. An angular velocity sensor comprising:
    a substrate;
    a plurality of movable portions movably supported on the substrate, being point-symmetry arranged from each other with respect to a predetermined point and being movable in a circumferential direction centering the predetermined point, and being arranged so as to be movable in a radial direction parallel to a surface of the substrate with respect to the predetermined point when angular velocity is generated around the predetermined point on a condition that the plurality of movable portions oscillate in the circumferential direction; and
    a detection portion confronted with the movable portions for detecting displacement of the movable portions in the radial direction in accordance with the angular velocity.

2. An angular velocity sensor according to claim 1, wherein the movable portions include a first movable portion and a second movable portion confronted with the first movable portion with the predetermined point interposed therebetween, and the first movable portion and the second movable portion are to be oscillated in the same phase.

3. An angular velocity sensor according to claim 1, wherein the number of the movable portions is selected from an even number.

4. An angular velocity sensor according to claim 1, wherein:
    the number of the movable portions is selected from multiples of four,
    every two movable portions being point-symmetry arranged from each other with respect to the predetermined point are to be oscillated in the same phase, and
    one half of the movable portions and another one half of the movable portions are oscillated in reverse phase.

5. An angular velocity sensor according to claim 4, wherein each of the movable portions adjacent to each other is oscillated in reverse phase.

6. An angular velocity sensor according to claim 1, wherein the detection portion is arranged on an outer side of the movable portions in the radial direction with respect to the predetermined point.

7. An angular velocity sensor according to claim 1, further comprising:
    a circuit portion for inputting an angular velocity signal from the detection portion for processing so as to output a signal due to Corioli's force acted to the movable portions.

8. An angular velocity sensor according to claim 7, wherein the circuit portion processes so as to output a signal due to Corioli's force acted to the movable portions with substantially canceling an external force acted on the movable portions.

9. An angular velocity sensor according to claim 1, wherein the detection portion comprises fixed electrodes fixed to the substrate so as to confront with the movable portions, for detecting capacitance changes between the fixed electrodes and the movable portions as a result of displacement of the movable portions along a flat plane parallel to the substrate.

10. An angular velocity sensor according to claim 1, wherein each of the movable portions comprises a first elastic member elastically deformable along an oscillation direction;

an oscillation portion supported to the substrate via the first elastic member;

a second elastic member connected to the oscillation portion, and being elastically deformable along a direction perpendicular to the oscillation direction in a flat plane parallel to the substrate; and a detection weight supported to the oscillation portion via the second elastic member.

11. An angular velocity sensor according to claim 10, wherein:

the substrate has a driving electrode having a comb-shape for confronting with the oscillation portion;

the oscillation portion has a confront electrode having a comb-shape for confronting with the driving electrode so as to mesh with the comb-shape of the driving electrode, and the driving electrode is for generating electrostatic force between the driving electrode and the confront electrode so as to oscillate the movable portions by applying an alternating voltage between the driving electrode and the confront electrode.

12. An angular velocity sensor according to claim 1, wherein the detection portion faces the movable portions in the radial direction, and detects changes in capacitance between the detection portion and the movable portions.

13. An angular velocity sensor according to claim 12, wherein the displacement is caused by the angular velocity applied around an axis perpendicular to a plane on which the movable portions are displaced.

14. An angular velocity sensor comprising:

a substrate;

a plurality of movable portions movably supported on the substrate, including a first movable portion and a second movable portion being point-symmetry arranged with the first movable portion with respect to a predetermined point, the first and second movable portions being oscillated in a circumferential direction centering the predetermined point in the same phase of each other, and being arranged so as to be movable in a radial direction parallel to a surface of the substrate with respect to the predetermined point when angular velocity is generated around the predetermined point on a condition that the first and second movable portions oscillate in the circumferential direction;

a detection portion provided at an outer side of the movable portions, for detecting displacement of the movable portions in the radial direction in accordance with the angular velocity; and a process circuit for processing signals from the detection portion and for outputting an angular velocity signal due to Corioli's force acting on the movable portions in a flat plane parallel to the substrate as a result of oscillation of the movable portions.

15. An angular velocity sensor according to claim 14, wherein the movable portions further includes a third movable portion and a fourth movable portion being point-symmetry arranged with the first movable portion with respect to a predetermined point, the third and fourth movable portions being oscillated in the circumferential direction about the predetermined point in the same phase of each other and in the reverse phase with respect to the phase of the first and the second movable portions.

16. An angular velocity sensor according to claim 14, wherein the detection portion faces the movable portions in the radial direction, and detects changes in capacitance between the detection portion and the movable portions.

17. An angular velocity sensor according to claim 16, wherein the displacement is caused by the angular velocity applied around an axis perpendicular to a plane on which the movable portions are displaced.

* * * * *